United States Patent [19]

Osafune et al.

[11] Patent Number: 4,680,045

[45] Date of Patent: Jul. 14, 1987

[54] METHOD OF PREPARING TUBULAR SILICA GLASS

[75] Inventors: Haruo Osafune; Sadao Kanbe; Teiichiro Mori; Masahisa Ikejiri, all of Nagano, Japan

[73] Assignee: Seiko Epson Kabushiki Kaisha, Tokyo, Japan

[21] Appl. No.: 782,333

[22] Filed: Oct. 1, 1985

[30] Foreign Application Priority Data

Oct. 4, 1984 [JP] Japan .................. 59-208917
Feb. 13, 1985 [JP] Japan .................. 60-26002

[51] Int. Cl.$^4$ .......................................... C03B 37/016
[52] U.S. Cl. ........................................ 65/17; 65/3.11; 65/18.1; 350/96.34; 501/12
[58] Field of Search ............... 501/12; 65/2, 17, 3.11, 65/3.12, 18.1, 18.2; 350/96.34

[56] References Cited

U.S. PATENT DOCUMENTS

| | | | |
|---|---|---|---|
| 4,173,459 | 11/1979 | Aulich et al. | 65/13 X |
| 4,324,576 | 4/1982 | Matsuyama et al. | 65/26 |
| 4,417,910 | 11/1983 | Passaret | 65/3.12 |
| 4,419,115 | 12/1983 | Johnson et al. | 65/3.12 |
| 4,574,063 | 3/1986 | Scherer | 65/18.1 X |

FOREIGN PATENT DOCUMENTS

2023571 1/1980 United Kingdom ............... 65/3.11

*Primary Examiner*—Robert Lindsay
*Attorney, Agent, or Firm*—Blum Kaplan

[57] ABSTRACT

A method of preparing tubular silica glass is disclosed. The method includes the steps of first hydrolyzing silicon alkoxide with acid and then adding ultra-fine particle silica to form a sol solution. The sol solution is placed in a cylindrical container and gelled while rotating the cylindrical container to obtain a tubular gel. The tubular gel is dried and sintered to the tubular silica glass.

43 Claims, 1 Drawing Figure

METHOD OF PREPARING TUBULAR SILICA GLASS

BACKGROUND OF THE INVENTION

This invention relates to silica glass and, in particular, to a method of preparing tubular silica glass.

Since the advent of the sol-gel method of making silica glass, it has been possible to make silica glass of greater purity than that which could have been made using prior art methods. The field of application of this improved purity silica glass is extremely wide and precise manufacturing methods, quality and configuration of the glass vary depending upon its intended end use.

For example, silica glass made by the sol-gel method has been widely used as crucibles or boards for manufacturing semi-conductor devices and as oven center tubes for defusing ovens. It is also used to make glass equipment such as test tubes for chemical use and cells for optical measurement. Additionally, silica glass made by the sol-gel method is widely used as a substrate for thin film transistors (TFT). As a result of the many applications to which silica glass made by the sol-gel method has been and continues to be put, demand for this glass is expected to expand significantly.

At present, optical fibers made of silica glass are used as a primary material in optical communication systems designed for transmission of large amounts of information. When manufacturing optical fibers, tubular silica glass is required, either as a starting material or as a means of adjusting the outer diameter of the completed fibers. The quality and dimensional precision of this tubular silica glass must meet very stringent requirements. Consequently, this glass is very expensive.

The prior art methods for manufacturing tubular silica glass (not necessarily for use in optical communication systems) include the following:

1. Washing and etching of natural quartz crystal;
2. Obtaining silicon oxide from high purity silicon tetrachloride or silicon tetrahydride; and
3. Etching natural silica sand.

All of these prior art methods have disadvantages. In each method, it is extremely difficult to obtain tubular silica glass that meets the quality and dimensional precision required for use in optical communication systems. Furthermore, treatment of the glass at extremely high temperature is an element of all of these methods and the cost of producing the glass is high as a result. Finally, the third method cannot be used to make optical fibers at all because of the low purity of the final product.

Recently, manufacture of tubular silica glass for use as optical fibers according to the sol-gel method has been attempted. The sol-gel method produces silica glass of high purity. Additionally, the glass is produced by relatively low temperature treatment, and therefore the manufacturing cost is relatively low. However, it is difficult to make large tubular glass articles by the conventional sol-gel method.

In a method introduced by Hitachi, Ltd. a solution of silicon alkoxide, water, alcohol, and a suitable solvent is placed into a cylindrical container having a removable center bar. The solution is gelled to form a gel. Before contraction of the gel begins, the center bar is removed. Then the gel is dried and sintered to obtain tubular silica glass. However, it is difficult to make large pieces of tubular glass without cracks and it is not possible to make a long tube of silica glass using this method.

E. M. Rabinovich and his colleagues have manufactured tubular silica glass using a sol-gel method with ultra-fine particles of silica. The ultra-fine particles of silica are gelled and sintered and then ground and suspended in water to provide a hydro-sol solution. The hydro-sol solution is placed in a cylindrical container having a center bar and gelled. After gelling, the center bar is removed in order to yield a tubular gel. The tubular gel is dried and sintered. The relatively large tubular silica glass obtained is reported to be 1.7 cm inner diameter, 2.3 cm outer diameter, and 25 cm length.

Using the Rabinovich method, fracturing or cracking of the sol in the gelling step or the gel in the sintering step is less frequent than that which occurs using the earlier described method. However, the dry gel obtained by the Rabinovich method includes large pores and fracturing and cracking does occur. Additionally, the method is disadvantageous because of the necessity of using two dispersing steps which results in a possibility of mixing impurities and of non-uniformity of the optical quality of the glass.

There are two reasons why large silica glass articles, including large tubular silica glass articles, are not be obtained using a conventional sol-gel method. When making the dry gel, the drying step is accompanied by a large contraction of the gel. Additionally, when sintering a dry gel, foaming occurs. Both phenomena cause cracking of the gel.

According to a study by Nogami and his colleagues, in order to prevent cracking from occurring at the time of sintering when using a sol-gel method with a silicon alkoxide containing sol as a starting material, it is necessary to prepare a porous dry gel having a great many relatively large pores of about 50 to 100 Å. This is supported by the fact that the dry gel obtained by Rabinovich et al. using the ultra-fine particles of silica is unlikely to crack. Additionally, the dry gels obtained by hydrolyzing a silicon alkoxide with aqueous ammonia (such dry gels are much more porous than ones obtained by hydrolyzing with acid) are relatively free from cracking.

The above described methods all include the step of uniformly dispensing the silica particles in the liquid phase. In order to accomplish this, stirring, application of ultrasonic vibration and the like are generally used. However, a great deal of energy and long periods of time are required to disperse the powdery material uniformly in the solution. It is also difficult to obtain a solution wherein the dispersion is perfectly uniform. However, if an agglomeration remains in the solution and appears in the completed glass articles, this represents a defect which lowers the quality of the glass product. Additionally, commercially available fumed silica generally includes impurities, such as Al and Fe in amounts ranging from a few ppm to several hundred ppm. Thus, such silicas are not particularly well suited for use in preparing optical glass in accordance with the invention.

Accordingly, it is desirable to provide a method for preparing tubular silica glass articles of larger dimension and of higher quality than those which can be provided using prior art methods and which overcomes the disadvantages inherent in the prior art methods.

SUMMARY OF THE INVENTION

Generally speaking, in accordance with the invention, a sol-gel method for preparing tubular silica glass articles is provided. A sol solution of an acid hydrolyzed solution of a silicon alkoxide and ultra-fine particles of silica is gelled in a rotating cylindrical container to provide a tubular gel. The tubular gel is dried and sintered to provide a tubular silica glass article.

The tubular glass may be prepared by gelling a first sol sol solution of a mixture of a silicon alkoxide hydrolyzed with an acid catalyst and a second solution of a silicon alkoxide hydrolyzed with a base catalyst in the rotating cylindrical container to yield the tubular gel. The pH of the two solutions may be adjusted as necessary. The tubular gel is then dried to a dry gel and sintered to form a transparent tubular glass article.

Accordingly, it is an object of the invention to provide an improved method of making tubular silica glass of high quality.

Another object of the invention is to provide an improved tubular silica glass article.

A further object of the invention is to provide an improved method for preparing tubular silica glass of high quality by gelling a solution of a hydrolyzed silicon alkoxide and ultra-fine particles of silica.

Still another object of the invention is to provide an improved method for preparing tubular silica glass of high quality using a high purity sol into which ultra-fine particles of silica are uniformly dispersed without expending a great deal of energy and without taking an inordinate amount of time.

Still a further object of the invention is to provide a method of making tubular silica glass that is free of mass defects and Al and Fe impurities.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

The method of the present invention includes the steps of preparing a sol solution of a hydrolyzed silicon alkoxide and ultra-fine particles of silica, gelling the sol solution in a rotating cylindrical container to yield a tubular gel, drying the tubular gel to provide a dry tubular gel, and sintering the dry tubular gel to remove pores and to provide a tubular silica glass articles. The sol solution can be prepared by adding water, an acid, such as hydrochloric acid, and/or a solvent to a silicon alkoxide and then adding ultra-fine particles of silica to the solution.

Alternatively, the sol solution can be prepared using two preparatory solutions. The first preparatory solution is a silicon alkoxide hydrolyzed with an acid catalyst and the second solution is a silicon alkoxide hydrolyzed with a base catalyst. The pH of the two solutions is adjusted as necessary and the solutions are combined to give the required sol solution.

In the first procedure for preparing the sol solution, the silicon alkoxide is hydrolyzed to yield a sol. The silicon alkoxide has the general formula $Si(OR)_4$ and can include, but is in no respect limited to, silicon methoxide, silicon ethoxide, silicon propoxide, and the like. In an especially preferred embodiment, silicon ethoxide is used. Alternatively, these materials may be referred to as alkyl silicates, such as methyl silicate, ethyl silicate and propyl silicate, with ethyl silicate being the preferred specie.

The hydrolysis of the silicon alkoxide is carried out by the addition of water, hydrochloric acid and/or a solvent, as necessary, to the silicon alkoxide. The hydrolyzing solution should be extremely acidic. Specifically, sufficient water and hydrochloric acid should be used so that the pH of the solution is between about 1 and 2.

If it is difficult to dissolve the silicon alkoxide in the water/hydrochloric acid, a suitable solvent can be used. In choosing a solvent, it is important to remember that the introduction of metal ions other than silicon is undesirable and should be avoided. The amount of solvent is not restricted, but in most cases use of a minimum effective amount is preferred.

Once the sol solution is prepared, ultra fine particles of silica are introduced into it. Ultra-fine particle silica, also known as white carbon, is commercially available, for example, under the names Cab-O-Sil (Cabot Corp., Boston, Mass.), Aerosil (Degussa Co.), D.C. Silica (Dow Corning Co.), and Arc Silica (PPG Co.). White carbon is made by hydrolyzing silicon tetrachloride in the presence of an oxy-hydrogen flame burner. The ultra-fine particles of silica make the dry gel porous, thereby reducing the incidence of cracking during subsequent steps.

Ultra-fine particle silica is preferably used in an amount of from about 0.2 to 5 moles silica per mole of silicon alkoxide. In other words, the molar ratio, ultra-fine particle silica:silicon alkoxide is about 1:0.2-5. It has been found that this ratio is optimum in reducing the tendency of the tubular silica glass to foam.

Following the addition of the silica, the sol is fully stirred to yield a sol solution. It is important to disperse the fine particle silica uniformly and to prevent the inclusion of even a small amount of impurities. The stirring may be accomplished by any of a number of well-known methods including, but in no respect limited to, mixing, application of ultrasonic vibration, and the like. Centrifugal separation to separate impurities may also be used and has been found to be extremely effective.

Alternatively, ultra-fine particle silica may be incorporated into the sol solution by a wet process using sodium silicate.

As a second alternative, fine particle silica can be produced by hydrolyzing silicon alkoxide with aqueous ammonia. This fine particle silica is similar to the above-mentioned white carbon and can also be used.

The pH of the sol solution as prepared is preferably in the range of from about 1 to 2. After preparation, it is desirable to raise the pH. In a most preferred embodiment, the pH is raised to between about 3 and 6.

The pH of the sol solution can be raised, for example, by the addition of a base. The base can be selected from the group consisting of, but not in any respect limited to, aqueous ammonia, ammonia gas, an organic base such as triethylamine, an aqueous solution of triethylamine, pyridine, an aqueous solution of pyridine, aniline, an aqueous solution of aniline, and the like. Bases including metal ions such as sodium hydroxide, potassium hydroxide and the like are generally not desirable because the metal ions remain in the final product. However, bases including metal ions are effective in producing multi-component glass such as soda glass and this is sometimes desirable.

It is also contemplated that the pH of the sol can be adjusted prior to the addition of the ultra-fine particle silica. This reversal of steps has no effect on the nature of the final sol solution.

In a second method for preparing the ultra-fine particle silica containing sol solution, two preparatory solutions are prepared. The first solution is a solution of silicon alkoxide hydrolyzed with an acid catalyst (hereinafter referred to as "Solution A"). The second solution is a solution of silicon alkoxide hydrolyzed with a base catalyst (hereinafter referred to as "Solution B").

The ultra-fine particle silica containing sol solution is obtained by mixing Solution A and Solution B. Both Solution A and Solution B are liquid and no particular steps are necessary to disperse the silica. Furthermore, the reagents used can be refined easily and consequently the material has a high degree of purity.

The size of the silicon oxide particles resulting from the hydrolysis of the alkyl silicate varies with the catalyst used. Especially in the case of the base catalyst, a larger silica particle is obtained compared to the size of the particle obtained when the acid catalyst is used. When the acid catalyst is used, the size of the silica particle is arbitrarily defined by adjusting the conditions. The conditions which can be adjusted and which will have an effect include the amount of catalyst, the amount of silicon alkoxide used with respect to the amount of solvent, the amount of water, temperature, and the like. In a most preferred embodiment, the diameter of the resulting silica particles is between about $0.01\mu$ and $1\mu$.

The concentration of silica in Solution B depends upon synthesizing conditions. It is generally very low. This is due to the fact the unless the amount of solvent is large with respect to the amount of silicon alkoxide, it is difficult to obtain uniformly sized silica particles. It therefore becomes necessary to condense Solution B. The desired concentration of silica in Solution B is between about 0.15 g/cc and about 1.0 g/cc.

In order to obtain large and high quality silica glass articles, the mixture ratio of Solution A and Solution B must be kept in a well-defined range. The ratio of the molar amount of silica of Solution A with respect to the molar amount of silica of Solution B should be between about 0.2 and 3.0. In other words, if we define M(A) as the molar amount of silica of Solution A and M(B) as the molar amount of silica of Solution B, the M(A)/M(B) is between about 0.2 and 3.

As in the initial method for preparation of a sol, it is desirable to adjust the pH of the completed sol to between about 3 and 6. This can be done by adjusting the pH of Solution A and/or Solution B before mixing. This is especially desirable because by mixing Solution A and Solution B directly, the acid and the base are neutralized with the pH of the sol being about 6. As a result, the sol is quickly gelled, which is undesirable.

The possible methods for adjusting the pH are:

1. Lower the pH of Solution A;
2. Lower the pH of Solution B; or,
3. Lower the pH of both of Solutions A and B.

The condition of the sol and the quality of the final product are not affected by the method chosen. Alternatively, it is possible to adjust the pH of the final sol solution after mixture of Solution A and Solution B. The pH adjustment can be accomplished by the addition of aqueous ammonia, hydrochloric acid, or the like, as discussed above.

When preparation is complete, the sol solution containing ultra-fine particles of silica is placed into a cylindrical container. The container, or at least the interior of the container, is preferably made of a hydrophobic material. Such materials include, but are not limited to, organic polymers such as polypropylene, polyethylene fluoride, polyvinyl chloride, polyethylene, polystyrene, and the like. Containers formed by depositing an organic polymer of the type named above on the interior surface of a container made of an inorganic material such as glass is also contemplated.

The container should have a cover with openings to permit evaporation of solvent during the gelling step. The total area of the openings should be less than 50% of the total area of the cover. In an especially preferred embodiment, the ratio of the area of the openings to the area of the cover is less than 10%.

Figure 1:
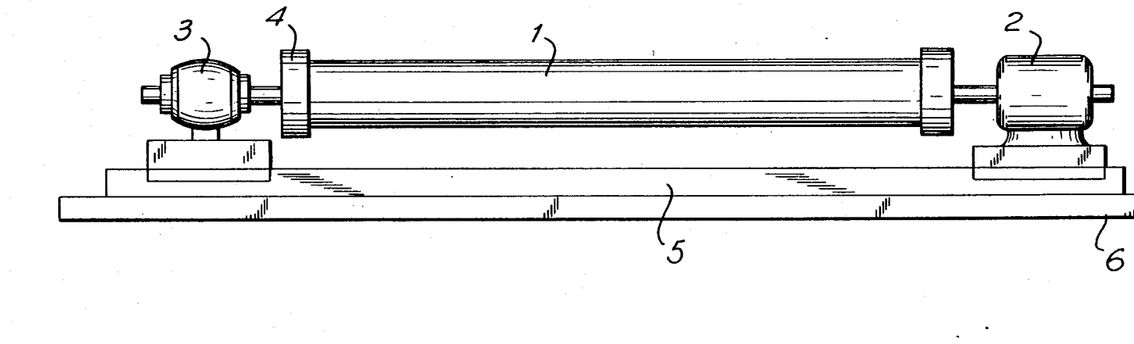
FIG. 1 is an elevational view of a cylindrical rotating container used in accordance with the method of the present invention.

An example of a suitable rotating machine 7 having a cylindrical container 1 is shown in FIG. 1. The sol solution is placed into container 1 and container 1 is secured between securing members 4. A motor 2 based on a supporting plate 6 and having a guide rail 5 rotates the container 1 between itself and the shaft receiver 3. Openings in the cover of container 1 are not shown.

The rotating action of a container of the type shown in FIG. 1 on a sol solution inside the container provides a tubular gel with good dimensional precision because of the centrifugal force exerted on the sol solution. The inner surface of the container is a smooth free surface. As can be seen, the dimensional precision and size of the tubular gel, and ultimately of the tubular silica glass, is dependent on the precision of the rotating machine and the size and precision of the inner surface of the cylindrical container.

When the container is rotated under usual conditions, the ultra-fine particles of silica in the sol solution settle out as a result of the effect of centrifugal force. This settling out makes the composition of the sol, and consequently, of the gel, non-uniform. Non-uniformity causes both cracking of the gel at the time of drying or sintering and deterioration of the optical properties of the resulting glass. Consequently, the number and time of rotations, the concentration of silica particles in the sol solution and the size of the silica particles must be controlled so that the ultra-fine silica particles in the sol solution do not settle out.

The settling out of the silica particles is controlled primarily by the speed of rotation. This is due to the fact that the size of the container and the composition of the sol solution are constant. Consequently, the rotation time is a constant which is determined by the time required for gelation to occur.

The minimum centrifugal acceleration affecting the silica particles in the sol solution in the rotating container is 1 G (980 cm/sec). The maximum centrifugal acceleration varies with the particle diameter of the silica particles, the distance between the silica particles, and the diameter of the container. For this reason, the speed of rotation cannot be defined precisely in every case, but an approximation can be made.

A few examples serve to illustrate the point. When the particle diameter of the ultra-fine silica particles is about 500 Å, the diameter of the rotating container 1 is 5 cm, and the silica particles near the outermost circumference of the container are exposed to centrifugal gravity of 500 G for more than 30 minutes, the settling out of the silica is considerable. On the other hand, if the sol solution does not include silica particles and is subject to centrifugal gravity of more than 1000 G, cracking occurs at the time of gelation. Accordingly, it is desirable that the speed of rotation be selected so that the centrifugal gravity to which the sol solution is subject does not exceed 1000 G.

When the above-described procedure has been completed, a wet gel will be present on the inside surface of the container. The next step in the method of the invention is to dry the wet gel to provide a dry gel. This step has a significant influence on the final yield of the product.

When the gel is dried it contracts by up to 70% of its original size. It is necessary for the affinity between the gel and the inner surface of the container to be weak in order to permit the gel to slip easily. This is why the inner surface of the container should be a hydrophobic organic polymer.

In producing a large dry gel, if the container and the drying conditions are not adequate, the yield will be low. In order to permit the contraction of the wet gel without cracking, the inside of the wet gel is dried uniformly. This means that the wet gel should be dried slowly.

It has also been found that the resistance of the gel to cracking during the drying step is largely dependent on the pH of the gel. A pH between about 3 and 6 has been found to be optimum. When the gel has a pH in this range, not only is it strong and unlikely to crack, but the gelation time is optimum. When the pH of the sol is about 6, the time required for gelation is so short that gelation is instantly completed; if the pH of the sol is less than 3, the stable state of the sol lasts for a long time.

Additionally, it has been found that the size of the pores in the dry gel is important. The pores must be large in order to prevent cracking and fracturing in subsequent steps. When the sol solution is prepared using Solutions A and B as described above, the relatively large particles in Solution B have the effect of creating large pores. Furthermore, the relatively small particles in Solution A strengthen the adhesive force between the particles in Solution B.

The drying conditions depend on the evaporation rate of the solvent, such as water and/or alcohol, which is included in the gel. The conditions are optimized with respect to the total area of the openings in the cover of the container as compared to the total area of the cover (this is the opening ratio and is expressed as a percentage), drying temperature and humidity.

If the opening ratio is reduced, the evaporation rate of the solvent in the gel is slowed down and cracking of the gel becomes unlikely. However, this prolongs the time required for manufacturing and thereby increases the manufacturing costs. The most desirable conditions are those which optimize shortened manufacturing time in conjunction with high yield of dry gel.

Another condition which should be optimized is the drying temperature. On one hand, the higher the temperature, the stronger the gel will be and the less the gel will tend to crack. However, if the drying temperature is higher than the boiling point of the solvent, it is extremely difficult to control the drying speed.

It has been found that the drying temperature should be less than or equal to a maximum of about 160° C. and the heating rate should be less than or equal to about 120° C. per hour. Additionally, the opening ratio should be less than or equal to about 50%, and more preferably should be less than or equal to about 10%.

For example, the gel should be heated to between about 20° C. (room temperature) and about 160° C. at a heating rate of less than about 120° C. per hour with an opening ratio less than or equal to about 50%. More preferably, the opening ratio is less than or equal to about 10%. This will serve to give a dry gel in a relatively short period of time with good yield.

When the sol solution is prepared by mixing Solutions A and B, as described above, the characteristics of the formed dry gel bear a close relationship to the rate of mixing of Solutions A and B. When Solution A has been mixed too rapidly, the smaller the pores in the dry gel will be, and the greater the chance of fracturing or cracking of the dry gel. On the other hand, when Solution B has been mixed too rapidly, the pores may be too large, thereby decreasing the strength of the dry gel and requiring higher temperatures for sintering.

It has also been found that the yield of dry gel can be improved by transferring the wet gel to a second container with a cover having about a 10% opening ratio before drying. This is a most desirable method for increasing productivity without sacrificing yield.

Once the dry gel is obtained, the final step of the method of the present invention is the sintering step. The sintering step is actually a series of steps. As few as three steps or as many as seven steps can be used.

The complete sintering process includes the following seven steps:
1. Removing absorbed water;
2. Removing carbon;
3. Accelerating the dehydrating condensation reaction;
4. Removing OH groups;
5. Removing Cl or F;
6. Closing pores in the dry gel; and
7. Making the dry gel into transparent glass.

Steps 1, 2 and 6 are considered to be essential to the sintering process. Steps 3, 4, 5 and 7 are optional and their use depends on the conditions present and the use to which the tubular silica glass is to be put.

Step 1 of removing absorbed water has a great influence on the yield of final product. A great deal of physically absorbed water exists in the dry gel and this water can be eliminated by heat treatment of the dry gel at a temperature up to about 400° C. If an attempt is made to heat the gel too quickly in order to remove the absorbed water, the gel frequently tends to crack, thereby reducing the yield. On the other hand, if the heating rate is slow, the yield is improved but manufacturing costs increase due to the length of time involved. It has been found that the dry gel should be heated at a rate of no more than about 400° C. per hour in order to optimize yield and manufacturing costs. The dry gel should be maintained at a temperature between about 20° C. (room temperature) and about 400° C. for a period of at least one hour. To further improve yield, this step may be carried out more than once.

In Step 2 of the sintering process carbons are eliminated using a second heat treatment. The final temperature of this heat treatment should be in the range of from about 400° to 1100° C., and, more preferably, in the range of from about 400° to 900° C. As in Step 1, the heating rate has an influence on the yield, though not as great an influence as the heating rate used in Step 1. Experimental observation has shown that the most suitable heating rate is between about 30° and 400° C. per hour. The gel should be maintained at the selected temperature for at least three hours at least once.

If the pH of the sol solution had been previously adjusted by the additions of a base, the salt of the base remains in the dry gel. This salt is removed together with the carbons in Step 2. Furthermore, it is desirable to carry out this step under an oxygen atmosphere.

The third step of the sintering process is acceleration of the dehydrating condensation reaction. This step is considered to be optional. However, it has been found that when Step 3 is omitted and Step 4 is included (Step 4 being removal of OH groups), a large amount of OH group removing agent is consumed and foaming frequently occurs in subsequent steps.

Step 3 is carried out by heating the dry gel to a temperature of between about 900° and 1200° C. The heating rate is between about 30° and 400° C. per hour and the dry gel is maintained at the selected temperature for at least one-half hour. As in Steps 1 and 2, the heating rate in Step 3 has an effect on the yield, but the range mentioned is suitable. Step 3 can also be repeated more than once.

Step 4, removal of OH groups in the dry gel, is also considered to be an optional step. However, when the tubular silica glass is to be used as a clad material for optical fiber, the content of the OH group must be less than 1 ppm. In such a case Step 4 is considered to be necessary.

The OH group is removed by heating the dry gel to a temperature of between about 700° and 1100° C. A carrier gas which does not include impurities such as water and an OH group removing agent provide the atmosphere in the sintering oven. The removing agent is used in an amount greater than about 1% with respect to the carrier gas. Preferably, from about 1% to 40% of OH group removing agent with respect to the carrier gas is used.

The OH group removing agent is preferably a reagent which reacts with silicon hydroxide (SiOH) to form silicon chloride (SiCl) or silicon fluoride (SiF). Based on cost and ease of handling, chlorine gas ($Cl_2$), chlorine sulfoxide (SOCl), sulfur hexafluoride ($SF_6$), carbon tetrafluoride ($CF_4$), ethane hexafluoride ($C_2F_6$), and propane octafluoride ($C_3F_8$) are used.

Step 5, removal of chlorine or fluorine, is also considered to be an optional step. However, when Step 4 is used, Step 5 is considered necessary. Furthermore, if Step 5 is omitted and the sintering proceeds, chlorine or fluorine existing in the silica glass will cause foaming during subsequent steps.

Chlorine or fluorine is removed by flowing a gas such as helium (He) or oxygen ($O_2$) in an amount of between about 1% and 100% with respect to the carrier gas into the sintering oven. The temperature should be in the range of from about 800° to 1200° C.

In Step 6 the pores of the dry gel are closed. This is a necessary step in the sintering process. Step 6 is accomplished by heating the dry gel in a vacuum or under a helium atmosphere. If the pores are closed without vacuum conditions or helium atmosphere, the gas in the atmosphere is enclosed in the pores. This causes foaming during subsequent steps.

As in previous steps, the heating rate of the dry gel has an effect on the yield and a suitable heating rate is between about 30° and 400° C. per hour. The final temperature is between about 1000° and 1400° C. and, more preferably, is in the range of from about 1000° to 1350° C.

It has been found that when the sol solution is prepared according to the second method described above, the temperature at which the closed pores are produced in the glass varies with the mixing rate of Solution A and Solution B, the concentration of silica in the resulting sol, the mean particle diameter of silica in Solution B, the particle diameter distribution of silica in Solution B, pore diameter distribution in the gel, water content in the gel, heating rate and the like. Accordingly, it is necessary to determine a final temperature based on an investigation of the reagent used in the step of closing the pores. The temperature should fall within the range specified above.

In Step 7, the dry gel is made into a transparent silica glass. This is accomplished by heating the dry gel to a temperature of between about 1200° and 1600° C. This temperature is maintained for a predetermined period of time. When Step 7 is completed, a high-quality tubular silica glass product is obtained. Since very little or no foaming occurs in the silica glass, the optical properties are excellent.

In an alternate embodiment, Steps 6 and 7 can be combined. This is accomplished by maintaining the gel at a temperature of between about 1000° and 1400° C. for a predetermined period of time. The dry gel then becomes non-porous and transparent silica glass is obtained in one step. The transparent silica glass has near infrared absorption spectra, Vickers hardness, and specific gravity equivalent to those of conventional silica glass.

If the silica glass is maintained for a long time at a temperature higher than that necessary for making the gel non-porous, foam tends to be produced in the glass. The appearance of this foaming phenomenon is dependent on the water content of the silica glass after it is made non-porous. The lower the water content of the silica glass, the lower the incidence of foaming.

The water content of the silica glass in turn depends on the concentration of the ultra-fine silica particles. The greater the concentration of silica, the less frequent the foaming. It is for this reason that it is important to keep the silica concentration within the specified range.

Additionally, it has been found that when the ultra-fine particle silica is not dispersed uniformly or when the sol solution includes even a small amount of impurities, a devitrification phenomenon occurs. This devitrification phenomenon manifests itself by the production of crystals like crystbalite or trydimite in the silica glass. This is the reason it is so important to disperse the silica uniformly and to separate out the impurities.

For a better understanding of the process of the present invention, reference is made to the following examples. These examples are presented for purposes of illustration only and are not intended to be construed in a limiting sense.

EXAMPLE 1

840 ml of 0.01 normal hydrochloric acid was added to 624 g of refined commmercially available silicon ethoxide and the mixture was stirred violently in order to hydrolyze the silicon ethoxide. 216 g of ultra-fine particle silica having a surface area of 200 m$^2$/g (Cab-O-Sil) was added to the resulting sol solution with stirring. 0.1 normal ammonia was added dropwise to adjust the pH of the sol solution to 4.5.

1256 of the sol solution was placed into a rotating cylindrical container of vinyl chloride. The inner diameter of the container was 5 cm and the length was 100 cm. Both ends of the container were sealed with rubber stoppers. The container was set in a rotating machine of the type shown by FIG. 1 and rotated at a rate of 2000 rpm. After 50 minutes, and after confirming that gelation of a control sample was complete, the container was removed from the rotating machine and maintained overnight.

The resulting gel was placed into a box container of polypropylene. The dimensions of the box container were 50 cm in width, 120 cm in length and 20 cm in height. The gel in the box container was heated from 20° C. to 60° C. at a heating rate of 2° C. per hour. The gel was dried at 60° C. for 7 days to yield a dry gel having the dimensions of 3 cm outer diameter, 2 cm inner diameter and 60 cm length. The gel was sufficiently stable so that no cracking occurred, even at room temperature. Two of 20 dry gels made under these conditions cracked; 18 did not crack. Yield of dry gels: 90%.

The 18 dry gels were placed into a sintering oven and heated from room temperature to 200° C. at a heating rate of 60° C. per hour. The gels were maintained at 200° C. for one hour in order to remove absorbed water. Heating was continued to 950° C. at a rate of 180° C. per hour. The materials were maintained at 950° C. for 18 hours in order to remove carbon and ammonium chloride. The temperature was again raised to 1200° C. at a heating rate of 180° C. per hour and the dry gel was maintained at this temperature for 1.5 hours until it became non-porous. Transparent tubular silica glass having the dimensions 2.5 cm outer diameter, 1.5 cm inner diameter and 50 cm length was obtained. No cracking occurred during the sintering process; all of the 18 tubular silica glasses were complete. Yield of tubular silica glass from dry gels: 100%.

EXAMPLE 2

840 ml of 0.01 normal hydrochloric acid was added to 624 g of refined commercially available silicon ethoxide and the resulting solution was stirred violently to hydrolyze the silicon ethoxide and yield a sol. 77.4 g of ultra fumed silica (Nipsil E220A produced by Nihon Silica Kogyo Co., Ltd.) having a particle diameter of 1.5 um and obtained by a wet process using sodium silicate as a starting material was incorporated into the sol with stirring. Ultrasonic vibration was applied to the sol. The pH of the sol was adjusted to 4.5 by dropwise addition of 0.1 normal ammonia.

1256 ml of the resulting sol solution was placed into a cylindrical rotating container of vinyl chloride. The dimensions of the container were 5 cm inner diameter and 100 cm length. Both ends of the container were sealed with rubber stoppers. The container was positioned in a rotating machine like the one shown in FIG. 1 and rotated at a rate of 1500 rpm. The rotation was continued for 60 minutes. After confirming that gelation was complete from a control sample, the container was removed from the rotating machine and maintained overnight.

The resulting gel was placed into a box container of polypropylene with dimensions of 50 cm in width, 120 cm in length and 20 cm in height. The box container had a lid with openings amounting to 0.8% of the surface area of the lid. The gel was heated from 20° C. to 70° C. at a heating rate of 2° C. per hour. After drying the gel at 70° C. for 12 days, the dry gel (2.5 cm outer diameter, 1.5 cm inner diameter and 50 cm length) was stable enough so that no cracking occurred even when it was maintained at room temperature. Three of 20 dry gels produced under these conditions cracked; 17 did not crack. Yield of dry gels: 85%.

The 17 dry gels were placed in a sintering oven and heated from room temperature at 300° C. at a heating rate of 60° C. per hour. They were maintained at 300° C. for 2 hours in order to remove absorbed water. The dry gels were heated further to 950° C. at a heating rate of 180° C. per hour and maintained at 950° C. for 18 hours to remove carbon and ammonium chloride. Then the temperature was raised further to 1120° C. at a rate of 180° C. per hour and the dry gels were maintained at 1120° C. for 1.5 hours until they became non-porous. Transparent tubular silica glass having dimensions of 2.1 cm outer diameter, 1.3 cm inner diameter and 43 cm length was obtained. During the sintering process, 2 dry gels cracked and 15 tubular silica glasses were obtained. Yield of tubular silica glasses from dry gels: 88.2%.

EXAMPLE 3

840 ml of 0.01 normal hydrochloric acid was added to 624 g of refined commercial available silicon ethoxide and the solution was stirred violently to carry out hydrolysis of the silicon ethoxide and yield a sol. Separately, a mixture solution of 14 ml of 28% aqueous ammonia, 10 l of ethanol and 200 ml of water was added to a mixture solution containing 800 ml of silicon ethoxide and 3.4 l of ethanol. The resulting solution was stirred at room temperature. After maintaining the solution overnight, ultra-fine particles of silica were collected by thickening the solution under reduced pressure. The ultra-fine particle silica was dried overnight at 200° C. under a nitrogen atmosphere. 180 g of the ultra-fine particle silica was added to the hydrolyzed solution with stirring. Ultrasonic vibration was applied to obtain a sol solution in which the silica was uniformly dispersed. 0.1 normal ammonia water was added dropwise to the sol to adjust the pH to 4.5.

1256 ml of the sol solution was placed into a cylindrical rotating container of vinyl chloride. The dimensions of the container were 5 cm inner diameter and 100 cm length. Both ends of the container were sealed with rubber stoppers. The container was set in a rotating machine of the type shown in FIG. 1 and rotated at a rate of 500 rpm. After rotating 30 minutes and confirming that gelation was complete, the container was removed from the rotating machine and maintained overnight.

The resulting gel was placed into a polypropylene box container (50 cm in width, 120 cm in length and 20 cm in height) having a lid with openings. The surface area of the openings amounted to 1.0% of the surface area of the lid. The gel was heated from 20° C. to 60° C. at a heating rate of 2° C. per hour. After drying the gel at 60° C. for 7 days, a dry gel (3.5 cm outer diameter, 2.1 cm inner diameter and 70 cm length), which was stable enough so that no cracking occurred even at room temperature, was obtained. Three of 20 dry gels formed under these conditions cracked; 17 did not crack. Yield of dry gels: 85%.

The 17 dry gels were placed in a sintering oven and heated from room temperature to 200° C. at a heating rate of 60° C. per hour and maintained at 200° C. for 3 hours. The temperature was raised further to 300° C. at a rate of 60° C. per hour and the dry gels were maintained at 300° C. for 5 hours in order to remove absorbed water. Heating was continued to 950° C. at a rate of 180° C. per hour. The gels were maintained at 950° C. for 18 hours in order to remove carbon and ammonium chloride. Then the temperature was raised further to 1220° C. at a rate of 180° C. per hour and the gels were maintained for 1.5 hours. The dry gels become non-porous as a result of this process and transparent tubular silica glass (2.4 cm outer diameter, 1.4 cm inner diameter and 47 cm length) was obtained. During the sintering process, 5 dry gels cracked and 12 tubular silica glasses were obtained. Yield of tubular silica glass from dry gels: 70.6%.

None of the tubular silica glass exhibited devitrification or foaming. The quality of all of the tubular silica glass was excellent.

EXAMPLE 4

840 ml of 0.01 normal hydrochloric acid was added to 456 g of refined silicon methoxide and the solution was stirred violently to hydrolyze the silicon methoxide. 270 g of ultra-fine particle silica having a surface area of 50 m$^2$/g (Aerosil) was added to the solution with stirring and ultrasonic vibration was applied. Masses were removed by centrifugal separation to obtain a sol solution in which silica was uniformly dispersed. 0.1 normal ammonia water was added dropwise to the resulting sol solution to adjust the pH to 4.5.

1256 ml of the resulting sol solution was placed into a cylindrical rotating container made of vinyl chloride. The dimensions of the rotating container were 5 cm inner diameter and 100 cm in length. Both ends of the container were sealed with rubber stoppers. The container was positioned in a rotating machine of the type shown FIG. 1 and rotated at a rate of 1000 rpm. After rotating for 30 minutes, and after confirming that a control sample was completely gelled, the container was removed from the rotating machine and maintained overnight.

The resulting gel was placed into a polypropylene box container (50 cm in width, 120 cm in length and 20 cm in height) having a lid with openings. The openings had a surface area of 0.8% of the surface area of the lid. The gel was heated from 20° C. to 70° C. at a heating rate of 5° C. per hour and after drying the gel at 70° C. for 7 days, the dry gel (3.5 cm outer diameter, 2.1 cm inner diameter and 70 cm length) was stable enough so that no cracking occurred even at room temperature. Twenty dry gels formed under these conditions were completed without cracking. Yield of dry gels: 100%.

The 20 dry gels were placed in a sintering oven and heated from room temperature to 200° C. at a heating rate of 60° C. per hour. The dry gels were maintained for 3 hours and the temperature was raised to 300° C. at a rate of 60° C. per hour. The material was maintained at 300° C. for 5 hours in order to remove absorbed water. The dry gels were heated further to 950° C. at a heating rate of 180° C. per hour and maintained for 18 hours in order to remove carbon and ammonium chloride. The resulting dry gels were heated further to 1230° C. at a rate of 180° C. per hour and maintained for 1 hour until they became non-porous. Transparent tubular silica glass (2.5 cm outer diameter, 1.6 cm inner diameter and 52 cm length) was obtained. In the sintering process, no dry gels cracked and 20 complete tubular silica glasses were obtained. Yield of tubular silica glass from dry gels: 100%.

No devitrification or foaming occurred in preparing the tubular silica glass and the quality of the glass was excellent.

EXAMPLE 5

840 ml of 0.01 normal hydrochloric acid was added to 624 g of refined commercially available silicon ethoxide. The solution was stirred violently to hydrolyze the silicon ethoxide. 219 g of ultra-fine particle silica having a surface area of 50 m$^2$/g (Aerosil OX50) was added to the solution with stirring. Ultrasonic vibration was also applied. Mass substances were removed by centrifugal separation to obtain a sol solution in which silica was dispersed uniformly. The pH of the sol was adjusted to 4.5 by addition of a 0.1 mol/l solution of triethylamine in ethanol.

1256 ml of the resulting sol solution was placed into a cylindrical rotating container made of vinyl chloride. The dimensions of the container were 5 cm inner diameter and 100 cm length. Both ends of the container were sealed with rubber stoppers. The container was positioned in a rotating machine of the type shown in FIG. 1 and rotated at a rate of 500 rpm. After rotating for 30 minutes and confirming that gelation of a control sample was complete, the container was removed from the rotating machine and maintained overnight.

The resulting gel was placed into a polypropylene box container (50 cm in width, 120 cm in length and 20 cm in height) having a lid with openings. The surface area of the openings amounted to 1.0% of the surface area of the lid. The gel was heated from 40° C. to 70° C. at a heating rate of 5° C. per hour and dried at 70° C. for 7 days. The resulting dry gel (3.5 cm outer diameter, 2.1 cm inner diameter and 70 cm length) was stable enough so that no cracking occurred even at room temperature. Two of 20 dry gels formed under these conditions cracked and 18 complete dry gels were obtained. Yield of dry gels: 90%.

The 18 dry gels were placed in a sintering oven and heated from room temperature to 200° C. at a heating rate of 60° C. per hour. After maintaining the dry gels at 200° C. for 3 hours, the temperature was raised to 300° C. at a rate of 60° C. per hour. The dry gels were maintained at 300° C. for 5 hours to remove absorbed water. Then, the dry gels were heated further to 900° C. at a rate of 180° C. per hour and maintained for 9 hours in order to remove carbon and hydrochloride salts. Heating was continued to 1220° C. at a rate of 180° C. per hour and the gels were maintained at this temperature for 1.5 hours until they became non-porous. Transparent silica glass (2.5 cm outer diameter, 1.5 cm inner diameter and 50 cm length) was obtained. During the sintering process, none of the dry gels cracked and 18 complete silica glasses were obtained. Yield of tubular silica glass from dry gels: 100%.

No devitrification or foaming was observed during the sintering process and the quality of the silica glass was excellent.

EXAMPLE 6

840 ml of 0.01 normal hydrochloric acid was added to 624 g of refined commercially available silicon ethoxide and the solution was stirred violently in order to hydrolyze the silicon ethoxide. 219 g of ultra-fine particle silica having a surface area of 50 m$^2$/g (Aerosil OX50) was added to the resulting solution with stirring. Ultrasonic vibration was also applied. Mass substances were removed using centrifugal separation and a sol solution in which the silica was uniformly dispersed was obtained. A 0.1 mol/l solution of pyridine in ethanol was added dropwise to the sol solution to adjust the pH of 4.5.

1256 ml of the resulting sol solution was cast into a teflon cylindrical rotating container (5 cm inner diameter and 100 cm length). Both ends of the container were sealed with rubber stoppers. The container was positioned in a rotating machine of the type shown in FIG. 1 and rotated at a rate of 1500 rpm. After rotating for 30 minutes and confirming that a control sample was completely gelled, the container was removed from the rotating machine and maintained overnight.

The resulting gel was placed in a polypropylene box container (50 cm in width, 120 cm in length and 20 cm in height). The box container had a lid with openings amounting to 1.0% of the surface area of the lid. The gel was heated from 5° C. to 60° C. at a heating rate of 5° C. per hour. By drying the gel at 60° C. for 7 days, a dry gel (3.5 cm outer diameter, 2.1 cm inner diameter and 70 cm length) was obtained. The dry gel was stable enough so that no cracking occurred even at room temperature. Three of 20 dry gels formed under these conditions cracked and 17 complete dry gels were obtained. Yield of dry gels: 85%.

The 17 dry gels were placed in a sintering oven and heated from room temperature to 200° C. at a heating rate of 60° C. per hour. The dry gels were maintained at 200° C. for 3 hours. The material was heated further to 300° C. at a heating rate of 60° C. per hour and maintained at 300° C. for 5 hours in order to remove absorbed water. The material was heated still further to 900° C. at a rate of 180° C. per hour and maintained at 900° C. for 9 hours in order to remove carbon and hydrochloride salts. The temperature was raised again to 1220° C. at a rate of 180° C. per hour. The material was maintained at 1220° C. for 1.5 hours until it became non-porous. Transparent tubular silica glass (2.5 cm outer diameter, 1.5 cm inner diameter and 50 cm length) was obtained. In the sintering process, none of the dry gels cracked and 17 complete tubular silica glasses were obtained. Yield of tubular silica glass from dry gel: 100%.

No devitrification or foaming was observed and the quality of the glasses was excellent.

EXAMPLE 7

840 ml of 0.01 normal hydrochloric acid was added to 624 g of refined commercially available silicon ethoxide and the solution was stirred violently in order to hydrolyze the silicon ethoxide. 180 g of ultra-fine particle silica having a surface area of 200 m$^2$/g (Cab-O-Sil) was added to the resulting sol with stirring and ultrasonic vibration. Mass substances were removed by centrifugal separation so that the silica was uniformly dispersed in the sol solution. The pH of the sol solution was adjusted to 4.5 by bubbling a mixture of ammonia gas and nitrogen gas through it.

1256 ml of the resulting sol solution was cast into a cylindrical rotating container (5 cm inner diameter and 100 cm length) made of vinyl chloride. Both ends of the container were sealed with rubber stoppers. The container was set in a rotating machine of the type shown in FIG. 1 and rotated at a rate of 1000 rpm. After rotating for 50 minutes and confirming that a control sample was completely gelled, the container was removed from the rotating machine and maintained overnight.

The resulting gel was placed in a polypropylene box container (50 cm in width, 120 cm in length and 20 cm in height). The box container had a lid with openings amounting to 5.0% of the surface area of the lid. The gel was heated from 30° C. to 60° C. at a heating rate of 5° C. per hour. By drying the gel at 60° C. for 7 days, a dry gel (2.9 cm outer diameter, 1.9 cm inner diameter and 58 cm length), which was stable enough so that no cracking occurred even at room temperature, was obtained. Five of 20 dry gels formed under these conditions cracked and 15 complete dry gels were obtained. Yield of dry gels: 75%.

The 15 dry gels were placed in a sintering oven and heated from room temperature to 200° C. at a heating rate of 60° C. per hour. The dry gels were maintained at 200° C. for 3 hours, heated to 300° C. at a heating rate of 60° C. per hour and maintained at 300° C. for 5 hours in order to remove absorbed water. The dry gels were heated further to 950° C. at a rate of 180° C. per hour and maintained at 950° C. for 18 hours in order to remove carbon and ammonium chloride. Then the temperature was raised further to 1220° C. at a rate of 180° C. per hour. The material was maintained at 1220° C. for 1.5 hours in order to become non-porous. Transparent tubular silica glass (2.4 cm outer diameter, 1.5 cm inner diameter and 47 cm length) was obtained. None of the dry gels cracked during the sintering process and 15 complete tubular silica glasses were obtained. Yield of tubular silica glass from dry gels: 100%.

No devitrification or foaming was observed and the quality of the silica glasses were excellent.

EXAMPLE 8

540 ml of 0.02 normal hydrochloric acid was added to 624 g of refined commerically available silicon ethoxide. The solution was stirred violently in order to carry out the hydrolysis of the silicon ethoxide. 300 ml of water was added to the resulting sol and then 180 g of ultra-fine particle silica having a surface area of 50 m$^2$/g (Aerosil OX50) was added with stirring. The silica was uniformly dispersed in the sol by ultrasonic vibration. The pH of the resulting sol solution was 2.15.

1256 ml of the resulting sol solution was placed into a vinyl chloride cylindrical container (5 cm inner diameter and 100 cm length). Both ends of the container were sealed with rubber stoppers. The container was set in a rotating machine of the type shown in FIG. 1 and rotated at a rate of 2000 rpm. After rotating for 30 minutes and confirming that a control sample was completely gelled, the container was removed and maintained overnight.

The resulting gel was placed in a polypropylene box container (50 cm in width, 120 cm in length and 20 cm in height) having a lid with openings amounting to 0.1% of the surface area of the lid. The gel was heated from 20° C. to 60° C. at a heating rate of 2° C. per hour. By drying the gel at 60° C. for 15 days, the dry gel (3.5 cm outer diameter, 2.1 cm inner diameter and 70 cm height) became stable enough so that no cracking occurred even at room temperature. Eight of 20 dry gels formed under these conditions cracked and 12 complete dry gels were obtained. Yield of dry gels: 60%.

The 12 dry gels were placed in a sintering oven and heated from room temperature to 200° C. at a heating rate of 60° C. per hour. The gels were maintained at 200° C. for 3 hours. The material was heated further to 300° C. at a heating rate of 60° C. per hour and maintained at 300° C. for 5 hours in order to remove absorbed water. The material was heated still further to 950° C. at a rate of 180° C. per hour and was maintained at 950° C. for 3 hours in order to remove carbon. The temperature was raised again to 1200° C. at a rate of 180° C. per hour and maintained at 1200° C. for 1.5 hours until it became non-porous. Transparent tubular silica glass (2.4 cm outer diameter, 1.4 cm inner diameter and 47 cm length) was obtained. During the sintering process, none of the dry gels cracked and 12 complete tubular silica glasses were obtained. Yield of tubular silica glass from dry gels: 100%.

No devitrification or foaming was observed and the quality of the silica glass was excellent.

EXAMPLE 9

840 ml of 0.01 normal hydrochloric acid was added to 624 g of refined commercially available silicon ethoxide. The solution was stirred violently in order to hydrolyze the silicon ethoxide. 219 g of ultra-fine particle silica having a surface area of 50 $m^2/g$ (Aerosil OX50) was added to the resulting solution with stirring and ultrasonic vibration. Mass substances were removed by centrifugal separation to obtain a sol solution in which the silica was dispersed uniformly. 0.1 normal ammonia water was added dropwise to the sol solution until the pH was 4.5.

1256 ml of the resulting sol solution was placed into a cylindrical container (5 cm in inner diameter and 100 cm in length) made of vinyl chloride. Both ends of the container were sealed with rubber stoppers. The container was set in a rotating machine of the type shown in FIG. 1 and rotated at a rate of 1500 rpm. After rotating for 30 minutes and confirming that a control sample was completely gelled, the container was removed from the rotating machine and maintained overnight.

The resulting gel was placed in a polypropylene box container (50 cm in width, 120 cm in length and 20 cm in height) having a lid with openings amounting to 1.0% of the surface area of the lid. The gel was heated from 20° C. to 60° C. at a heating rate of 2° C. per hour. The gel was dried at 60° C. for 7 days. The resulting dry gel (3.5 cm outer diameter, 2.1 cm inner diameter and 70 cm length) was stable enough so that no cracking occurred even at room temperature. One of 20 dry gels formed under these conditions cracked and 19 complete dry gels were obtained. Yield of dry gels: 95%.

The 19 dry gels were placed in a sintering oven and heated from room temperature to 200° C. at a heating rate of 60° C. per hour. The material was maintained at 200° C. for 3 hours. Then the materials were heated to 300° C. at a rate of 60° C. per hour and maintained at 300° C. for 5 hours in order to remove absorbed water. The resulting dry gels were heated further to 950° C. at a heating rate of 180° C. per hour and maintained at 950° C. for 18 hours in order to remove carbon and ammonium chloride. The dry gels were heated further to 1220° C. at a rate of 180° C. and maintained at 1220° C. for 1.5 hours until they became non-porous. Transparent tubular silica glass (2.5 cm outer diameter, 1.5 cm inner diameter and 50 cm length) was obtained. During the sintering process, none of the dry gels cracked and 19 complete tubular silica glasses were obtained. Yield of tubular silica glass from dry gels: 100%.

No devitrification or foaming was observed and the quality of the silica glass was excellent.

EXAMPLE 10

840 ml of 0.01 normal hydrochloric acid was added to 624 g of refined commercially available silicon ethoxide. The solution was stirred violently in order to hydrolyze the silicon ethoxide. 900 g of ultra-fine particle silica having a surface area of 50 $m^2/g$ (Aerosil OX50) was added to the resulting solution with stirring and ultrasonic vibration. Mass substances were removed by centrifugal separation to obtain a sol solution in which silica was dispersed uniformly. 0.1 normal ammonia water was added dropwise to the sol solution until the pH was 4.0.

1256 ml of the resulting sol solution was placed into a vinyl chloride cylindrical rotating container (5 cm inner diameter and 100 cm length). Both ends of the container were sealed with rubber stoppers. The container was set in a rotating machine of the type shown in FIG. 1 and rotated at a rate of 500 rpm. After rotating for 60 minutes and confirming that a control sample was completely gelled, the container was removed from the rotating machine and maintained overnight.

The resulting gel was placed in a polypropylene box container (50 cm in width, 120 cm in length and 20 cm in height) having a lid with openings amounting to 2.0% of the surface area of the lid. The gel was heated from 25° C. to 60° C. at a heating rate of 2° C. per hour. The gel was dried at 60° C. for 7 days. The dry gel (4.0 cm outer diameter, 2.4 cm inner diameter and 80 cm length) was stable enough so that no cracking occurred even at room temperature. Five of 20 dry gels formed under these conditions cracked and 15 complete dry gels were obtained. Yield of dry gels: 75%.

The 15 dry gels were placed in a sintering oven and heated from room temperature to 300° C. at a heating rate of 10° C. per hour. The dry gels were maintained at 300° C. for 5 hours in order to remove absorbed water. Then the dry gels were heated further to 600° C. at a heating rate of 320° C. per hour and maintained at 600° C. for 9 hours in order to remove carbon and ammonium chloride. The dry gels were heated still further to 1400° C. at a rate of 320° C. per hour and maintained at 1400° C. for 0.5 hours until they became non-porous. Transparent tubular silica glass (3.2 cm outer diameter, 1.9 cm inner diameter and 64 cm length) was obtained. During the sintering process, none of the dry gels cracked and 15 complete tubular silica glasses were obtained. Yield of tubular silica glass from dry gels: 100%.

In spite of the fact that the silica glass in this embodiment was treated at relatively high temperature, namely, 1400° C., no foaming was observed in any of the resulting glasses. This implies that by keeping the concentration of the ultra-fine particle silica at about 5 mol of silica per mol of metal alkoxide, the problem with foaming is eliminated completely. However, if the concentration of the silica is more than 5 mol of silica per mol of silicon alkoxide, the sintering temperature must be high, thereby increasing the manufacturing cost. The resulting tubular silica glass becomes impractical to make because of the high cost.

EXAMPLE 11

540 ml of 0.02 normal hydrochloric acid was added to 624 g of refined commercially available silicon ethoxide and the solution was stirred violently in order to hydrolyze the silicon ethoxide. 300 ml of water was added to the resulting sol and then 36 g of ultra-fine particle silica having a surface area of 50 $m^2/g$ (Aerosil OX50) was added with stirring. The sol was subjected to ultrasonic vibration to obtain a sol solution in which the silica was dispersed uniformly. 0.1 normal ammonia water was added dropwise to the resulting sol solution until the pH was adjusted to 3.0.

1256 ml of the resulting sol solution was placed into a cylindrical container (5 cm inner diameter and 100 cm length) made of vinyl chloride. Both ends of the container were sealed with rubber stoppers. The container was set in a rotating machine of the type shown in FIG. 1 and rotated at a rate of 400 rpm. After rotating the container for 50 minutes and confirming that a control sample was completely gelled, the container was removed from the rotating machine and maintained overnight.

The resulting gel was placed in a polypropylene box container (50 cm in width, 120 cm in length and 20 cm in height) having a lid with openings amounting to 0.8% of the surface area of the lid. The gel was heated from 5° C. to 60° C. at a heating rate of 2° C. per hour. The gel was dried at 60° C. for 10 days. A dry gel (2.5 cm outer diameter, 1.5 cm inner diameter and 50 cm length), which was sufficiently stable so that no cracking occurred even at room temperature, was obtained. Ten of 20 dry gels formed under these conditions cracked and 10 complete dry gels were obtained. Yield of dry gels: 50%.

The 10 dry gels were placed in a sintering oven and heated from room temperature to 200° C. at a heating rate of 10° C. per hour. After maintaining the dry gels at 200° C. for 3 hours, the dry gels were heated further to 300° C. at a rate of 10° C. per hour. The gels were maintained at 300° C. for 5 hours in order to remove absorbed water. The dry gels were heated still further to 600° C. at a rate of 30° C. per hour and maintained at 600° C. for 18 hours in order to remove carbon and ammonium chloride. Then the temperature was raised again to 1000° C. at a rate of 30° C. per hour and the dry gels were maintained at 1000° C. for 1.5 hours until they became non-porous. Transparent tubular silica glass (2 cm outer diameter, 1.2 cm inner diameter and 40 cm length) was obtained. During the sintering process, 3 dry gels cracked and 7 complete tubular silica glasses were obtained. Yield of tubular silica glass from dry gels: 70%.

This experiment demonstrated that when the silica gels were maintained at 1200° C. for 30 minutes, no foaming occurred, but when they were maintained at 1300° C., foaming did occur. Furthermore, when the concentration of the ultra-fine particle silica was less than 0.2 mol per mol of silicon alkoxide, foaming occurred at 1200° C. in all samples. Accordingly, the concentration of the ultra-fine particle silica should be at least 0.2 mol per mol of silicon alkoxide.

EXAMPLE 12

840 ml of 0.01 normal hydrochloric acid was added to 624 g of refined commercially available silicon ethoxide and the solution was stirred violently in order to hydrolyze the silicon ethoxide. Then 126 g of ultra-fine particle silica having a surface area of 50 $m^2/g$ (Aerosil OX50) was added to the resulting solution with stirring and ultrasonic vibration. Mass substances were removed by centrifugal separation to obtain a sol solution in which the silica was dispersed uniformly. 0.1 normal ammonia water was added dropwise to the sol solution to adjust the pH to 6.0.

1256 ml of the resulting sol solution was placed into a cylindrical container (5 cm inner diameter and 100 cm length) made of vinyl chloride. Both ends of the container were sealed with rubber stoppers. The container was set in a rotating machine of the type shown in FIG. 1 and rotated at a rate of 1500 rpm. After rotating for 15 minutes and confirming that a control sample was completely gelled, the container was removed from the rotating machine and maintained overnight.

The resulting gel was placed in a box container (50 cm in width, 120 cm in length and 20 cm in height) made of polypropylene and having a lid with openings amounting to 2.0% of the surface area of the lid. The gel was heated from 5° C. to 65° C. at a heating rate of 5° C. per hour. After drying the gel at 65° C. for 7 days, the dry gel (2.8 cm outer diameter, 1.7 cm inner diameter and 56 cm length) was stable enough so that no cracking occurred even at room temperature. All of the 20 dry gels formed under these conditions were complete and there was no cracking. Yield of dry gels: 100%.

The resulting 20 dry gels were placed in a sintering oven and heated from room temperature to 200° C. at a heating rate of 60° C. per hour. After maintaining the dry gels at 200° C. for 3 hours, the dry gels were heated further to 300° C. at a heating rate of 400° C. per hour. They were maintained at 300° C. for 5 hours in order to remove absorbed water. The dry gels were heated still further to 1000° C. at a rate of 400° C. per hour and were maintained at 1000° C. for 8 hours in order to remove carbon and ammonium chloride. The temperature was raised further to 1150° C. at a rate of 400° C. per hour. The dry gels were maintained at 1150° C. for 1.5 hours until they became non-porous and transparent tubular silica glass (2.2 cm outer diameter, 1.4 cm inner diameter and 45 cm length) was obtained. During the sintering process, 2 dry gels cracked and 18 complete tubular silica glasses were obtained. Yield of tubular silica glass formed from dry gels: 90%.

No devitrification or foaming was observed and the quality of the glass was excellent.

As can be seen from this embodiment, when the pH of the sol solution is high, the yield of the dry gels is almost 100% which shows very good reproducibility. However, if the pH of the sol solution is higher than 6.0, the time required for gelation becomes extremely short and it is difficult to control the material. This is extremely disadvantageous in practical use.

EXAMPLE 13

840 ml of 0.01 normal hydrochloric acid was added to 624 g of refined commercially available silicon ethoxide and the solution was stirred violently in order to hydrolyze the silicon ethoxide. 219 g of ultra-fine particle silica having a surface area of 50 $m^2/g$ (Aerosil OX50) was added to the resulting solution with stirring and ultrasonic vibration. Mass substances were removed by centrifugal separation to obtain a sol solution in which the silica was dispersed uniformly. 0.1 normal ammonia water was added to the sol solution to adjust the pH to 4.1.

1256 ml of the resulting sol solution was placed into a cylindrical container (5 cm inner diameter and 100 cm length) made of vinyl chloride. Both ends of the container were sealed with rubber stoppers. The container was set in a rotating machine of the type shown in FIG. 1 and rotated at a rate of 1000 rpm. After rotating for 50 minutes and confirming that a control sample was completely gelled, the container was removed from the rotating machine and maintained overnight.

The resulting gel was placed in a box container (50 cm wide, 120 cm long and 20 cm high) made of polypropylene and having a lid with openings amounting to 0.5% of the surface area of the lid. The gel was heated from 60° C. to 120° C. at a heating rate of 2° C. per hour. By drying the gel at 120° C. for 4 days, the dry gel (3.5 cm outer diameter, 2.1 cm inner diameter and 70 cm length) was stable enough so that no cracking occurred even at room temperature. Six of 20 dry gels formed under these conditions cracked and 14 complete dry gels were obtained. Yield of dry gels: 70%.

The 14 dry gels were placed in a sintering oven and heated from room temperature to 400° C. at a heating rate of 60° C. per hour in order to remove absorbed water. The dry gels were heated further to 1100° C. at a rate of 180° C. per hour and maintained at 1100° C. for 3 hours in order to remove carbon and ammonium chloride. Then the temperature was raised to 1220° C. at a rate of 180° C. per hour. The dry gels were maintained at 1220° C. for 1.5 hours until they became non-porous. Transparent tubular silica glass (2.5 cm outer diameter, 1.5 cm inner diameter and 50 cm length) was obtained. During the sintering process, 3 dry gels cracked and 11 complete tubular silica glasses were obtained. Yield of tubular silica glasses from dry gels: 78.6%.

EXAMPLE 14

840 ml of 0.05 normal hydrochloric acid was added to 624 g of refined commercially available silicon ethoxide and the solution was stirred violently in order to hydrolyze the silicon ethoxide. Then 219 g of ultra-fine particle silica having a surface area of 50 m$^2$/g (Aerosil OX50) was added to the resulting solution with stirring and ultrasonic vibration. Mass substances were removed by centrifugal separation to obtain the sol solution in which silica was dispersed uniformly. 0.1 normal ammonia water was added to the sol solution to adjust the pH to 5.0.

1256 ml of the resulting sol solution was placed into a cylindrical container (5 cm inner diameter and 100 cm length) made of vinyl chloride. Both ends of the container were sealed with rubber stoppers. The container was set in a rotating machine of the type shown in FIG. 1 and rotated at the rate of 2000 rpm. After rotating for 30 minutes and confirming that a control sample was completely gelled, the container was removed from the rotating machine and maintained overnight.

The resulting gel was placed in a box container (50 cm in width, 120 cm in length and 20 cm in height) made of polypropylene having a lid with openings amounting to 5.0% of the surface area of the lid. The gels were heated from 5° C. to 20° C. at a heating rate of 120° C. per hour. By drying the gel at 2° C. for 22 days, the dry gel (3.7 cm outer diameter, 2.2 cm inner diameter and 74 cm length) was stable enough so that no cracking occurred even at room temperature. Sixteen of 20 dry gels formed under these conditions cracked and 4 complete dry gels were obtained. Yield of dry gels: 20%.

The 4 dry gels were placed in a sintering oven and heated from room temperature to 200° C. at a heating rate of 10° C. per hour. After maintaining the dry gels at 200° C. for 2 hours, the dry gels were heated further to 300° C. at a heating rate of 10° C. per hour. The gels were maintained at 300° C. for 2 hours in order to remove absorbed water. The dry gels were heated further to 950° C. at a rate of 180° C. per hour and maintained at 950° C. for 6 hours in order to remove carbon and ammonium chloride. The temperature was raised again to 1220° C. at a rate of 180° C. per hour. The dry gels were maintained at 1220° C. for 1.5 hours until they became non-porous. Transparent tubular silica glass (2.5 cm outer diameter, 1.5 cm inner diameter and 50 cm length) was obtained. During the sintering process, no dry gels cracked and 4 complete tubular silica glasses were obtained. Yield of tubular silica glass from dry gels: 100%.

No devitrification or foaming was observed and the quality of the tubular silica glass was excellent.

EXAMPLE 15

(1) Preparation of Solution A 200 g of 0.02 normal hydrochloric acid was added to 579.0 g of refined commercially available silicon ethoxide and the solution was stirred violently in order to hydrolyze the silicon ethoxide.

(2) Preparation of Solution B 2187 g of anhydrous ethanol, 72 ml of ammonia water and 300 g of water were added to 864.9 g of refined commercially available silicon ethoxide. The solution was stirred for 2 hours and maintained overnight. The diameter of silica particles, measured by granulometer, averaged 0.15 m.

(3) Concentration of Solution B

Solution B (prepared in Step (2)) was concentrated by reduction until the concentration of silica, which was 0.06 g/cc in the starting solution, became 0.40 g/cc.

(4) Adjustment of the pH before mixing

The pH of the condensed Solution B and Solution A were 8.30 and 2.10, respectively. The pH of Solution B was adjusted to 5.0 by the addition of 2 normal hydrochloric acid. The particle diameter of the silica of the resulting Solution B was measured again by granulometer and was found to be the same as in Step (2).

The pH of Solution A was not adjusted.

(5) Mixing of Solution A and Solution B 650 ml of Solution A (prepared in Step (1)) and 620 ml of Solution B (prepared in Step (4)) were mixed at a mixing rate such that the silica concentration of Solution A, M(A), with respect to the silica concentration of Solution B, M(B), was 0.67, i.e., M(A)/M(B) was 0.67. The resulting pH of the sol solution was 4.80.

(6) Rotating gelation 1256 ml of the sol solution (prepared in Step (5)) was placed into a steel cylindrical container with a vinyl chloride lining. The dimensions of the cylindrical container were 5 cm inner diameter and 100 cm length. Both ends of the steel container were sealed with silicon rubber and the container was set in a rotating machine of the type shown in FIG. 1. The container was rotated at a rate of 700 rpm until a control sample was completely gelled within 65 minutes. A wet gel of 5 cm outer diameter, 3 cm inner diameter and 98 cm length was obtained.

(7) Drying 10 wet gels (prepared in Step (6)) were maintained in the rotating steel container for 2 days and then placed into a box container constructed of stainless steel (15 cm in length, 120 cm in width and 20 cm in height) having a lid with openings covering 1% of the surface area of the lid. The wet gel was heated from room temperature (25° C.) to 70° C. at a heating rate of 2° C. per hour. The wet gel was maintained at 70° C. for 12 days. A dry gel (3.3 cm outer diameter, 2.0 inner diameter and 64 cm length) was obtained. The dry gel was stable enough so that no cracking occurred even at room temperature.

(8) Sintering

The dry gel (prepared in Step (7)) was placed in a tubular sintering oveh of quartz glass and heated from 30° C. to 200° C. at a heating rate of 30° C. per hour. After maintaining the dry gel at 200° C. for 5 hours, the dry gel was heated further to 300° C. at a heating rate of 30° C. per hour. The gel was maintained at 300° C. for 5 hours in order to remove absorbed water. Then the dry gel was heated further to 1100° C. at a rate of 30° C. per hour and maintained at 1100° C. for 30 minutes in order to remove carbon and ammonium chloride and to accelerate the dehydrating condensation reaction.

The temperature was lowered to 700° C. and the dry gel was maintained at 700° C. for 30 minutes while a mixture of He and $Cl_2$ flowed through the oven at a rate varying between about 2 l/min to 0.2 l/min. Then the dry gel was heated to 800° C. at a heating rate of 60° C. per hour while He only flowed through the oven. The dry gel was maintained at 800° C. for 1 hour while a mixture of He and $Cl_2$ flowed through the oven at a rate varying between about 2 l/min to 0.2 l/min. The dry gel was heated further to 900° C. at a heating rate of 60° C. per hour while He only flowed through the oven and the gel was maintained at 900° C. for 1 hour while a mixture of He and $Cl_2$ flowed through the oven at a rate varying between about 2 l/min to 0.2 l/min in order to remove the OH group. Then, the dry gel was heated further to 1050° C. at a heating rate of 60° C. per hour while a mixture of He and $O_2$ flowed through the oven at a rate of 2 l/min to 0.4 l/min and maintained at 1050° C. for 1 hour in order to remove chloride. The temperature was raised again to 1250° C. at a heating rate of 30° C. per hour while He only flowed through the oven and the gel was maintained at 1250° C. for 1 hour in order to close the pores of the gel. The sample was placed in a box oven and heated from 1200° C. to 1350° C. at a heating rate of 60° C. per hour. By maintaining the gel at 1350° C. for 1 hour, the gel became non-porous. Transparent tubular silica glass (2.6 cm outer diameter, 1.5 cm inner diameter and 50 cm length) was obtained.

No cracking occurred during the sintering process. Yield of tubular silica glass from dry gels: 100%.

The amount of OH group included in the silica glass was measured by infrared absorption spectra. There was no absorption peak at a wavelength equal to 2.70 $\mu m$ which indicated that the OH groups were present in an amount of 1 ppm or less.

The dimensional precision of the silica glass with respect to the tolerance of the inner and outer diameters was ±1% or less.

No inclusions or contaminants were observed.

Moreover, even when the tubular silica glass was heated to 2000° C. (a molten state) using a ring heater, no foaming was observed.

The tubular silica glass was useful for manufacturing optical fiber.

Another dry gel (prepared as in Step (7)) was sintered in the following way. The dry gel was placed in a tubular quartz sintering oven and heated from 30° C. to 200° C. at a heating rate of 30° C. per hour. The gel was maintained at 200° C. for 5 hours. Then the dry gel was heated from 200° C. to 300° C. at a heating rate of 30° C. per hour and maintained at 300° C. for 5 hours in order to remove absorbed water. The dry gel was heated further to 1000° C. at a heating rate of 30° C. per hour and maintained at 1000° C. for 10 hours in order to remove carbon and ammonium chloride and to accelerate the dehydrating condensation reaction.

The resulting dry gel was heated further to 1100° C. at a heating rate of 60° C. per hour, maintained at 1100° C. for 20 hours, heated to 1150° C. at a rate of 60° C. per hour and maintained at 1150° C. for 20 hours to accelerate the dehydrating condensation reaction in the state where the pores were open and to decrease the amount of OH group. Then the dry gel was heated further to 1250° C. at a heating rate of 30° C. per hour while He flowed through the oven at a rate of about 2 l/min and the gel was maintained at 1250° C. for 1 hour in order to close the pores. The material was then placed into a box oven and heated to 1350° C. at a heating rate of 60° C. per hour. After maintaining the dry gel at 1350° C. for 1 hour, the dry gel became non-porous and transparent tubular silica glass was obtained.

The amount of OH group in the silica glass was 400 ppm. Even when the silica glass was heated to 2000° C. (a molten state) using a ring heater, no foaming occurred.

Thus, despite the fact that the step of removing the OH group using chloride and the accompanying step of removing chloride were omitted, the tubular silica glass was satisfactory for use as a jacket tube for adjusting the outer diameter of an optical fiber.

EXAMPLE 16

(1) Preparation of Solution A

Solution A was prepared as in Example 15.

(2) Preparation of Solution B 2500 ml of anhydrous ethanol, 250 ml of 29% ammonia water and 165 g of water were added to 468 g of refined silicon ethoxide. The solution was stirred for 2 hours and maintained without stirring overnight. The particle size of the silica in the solution was measured using a granulometer and the mean particle diameter was 0.34$\mu$. The particle diameter of the silica particle which settled out after being maintained without stirring was 1$\mu$ or greater. This indicates that silica particles having a particle diameter of more than 1$\mu$ were disadvantageous in preparing a sol solution in which silica particles were uniformly dispersed.

(3)–(8) Concentration of Solution B, Adjustment of pH, Mixing of Solutions A and B, Rotating Gelation, Drying, and Sintering Steps (3) to (8) were carried out as in Example 15.

High-quality tubular silica glass was obtained. The water content of the silica glass was less than 1 ppm.

EXAMPLE 17

(1) Preparation of Solution A

Solution A was prepared as in Example 15, except that 1 normal nitric acid was used in place of the 0.02 normal hydrochloric acid.

(2), (3) Preparation and Concentration of Solution B

Solution B was prepared and condensed in the same way as in Example 15.

(4), (5) Adjustment of pH and Mixing of Solutions A and B

The pH of condensed Solution B was adjusted to 4.0 by the addition of 2.0 normal ammonia water and Solution B was mixed with Solution A to obtain a sol solution. The pH of the sol solution was 3.2. A sol solution with a pH as low as 3.2 does not gel even when maintained for a few days at room temperature. Therefore, 0.2 normal ammonia water was added dropwise until the pH of the sol solution was adjusted to 4.90.

(6) Rotating Gelation

The sol was gelled to a wet gel with rotation in the same way as in Example 15, except that the rotating rate was 1000 rpm.

(7) Drying

The wet gel was dried to the dry gel in the same way as in Example 15.

(8) Sintering

The resulting dry gel was placed in a tubular quartz glass sintering oven and heated from 30° C. to 200° C. at a heating rate of 30° C. per hour and was maintained at 200° C. for 5 hours. The dry gel was heated further to 300° C. at a heating rate of 30° C. per hour and maintained at 300° C. for 5 hours in order to remove absorbed water. Then the dry gel was heated to 1000° C. at a heating rate of 30° C. per hour and maintained at 1000° C. for 60 minutes in order to remove carbon and ammonium chloride and to accelerate the dehydrating condensation reaction. The temperature was lowered to 800° C. and the dry gel was maintained at 800° C. for 30 minutes while a mixture of He and $Cl_2$ flowed through the oven at a rate of from about 2 l/min to 0.2 l/min. The gel was heated further to 900° C. at a heating rate of 60° C. per hour while He only flowed through the oven. The gel was maintained at 900° C. for 1 hour while a mixture of He and $Cl_2$ flowed through the oven at a rate of from about 2 l/min to 0.2 l/min. The dry gel was heated further to 1050° C. at a rate of 60° C. per hour while a mixture of He and $O_2$ flowed through the oven at a rate of from about 2 l/min to 0.4 l/min. The gel was maintained at 1050° C. for 1 hour in order to remove chloride. The dry gel was heated again to 1250° C. at a heating rate of 30° C. per hour while He only flowed through the oven and the gel was maintained at 1250° C. for 30 minutes in order to close the pores.

The gel was placed into a box oven and heated from 1200° C. to 1350° C. at a heating rate of 60° C. per hour. By maintaining the gel at 1350° C. for 1 hour, the dry gel became non-porous and transparent tubular silica glass was obtained.

The number of OH groups in the silica glass was about 10 ppm at the center of the glass. No foaming was observed even when the silica glass was heated to a molten state.

EXAMPLE 18

(1), (2) Preparation of Solutions A and B

Twelve samples of Solution A and twelve samples of Solution B were prepared as in Example 15.

(3) Concentration of Solution B

The conditions for concentrating Solution B were varied experimentally. Three samples were used for each of 4 conditions. Three solutions were concentrated until the concentration of silica was 0.06 g/cc, three until the concentration of silica was 0.10 g/cc, three until the concentration of silica was 0.15 g/cc, and three until the concentration of silica was 0.20 g/cc.

When Solution B was concentrated to a concentration exceeding 1.0 g/cc, the viscosity of the solution increased abruptly. It was, therefore, impossible to obtain a solution in which the silica was uniformly dispersed at that concentration. Accordingly, there is no advantage to concentrating Solution B to a concentration of silica greater than 1.0 g/cc.

(4), (5) Mixing of Solutions A and B and Adjustment of pH

Since the volume ratio of Solution A and Solution B was different for each condition, the pH of the mixture was different. In each case, the final pH of the mixture of the two solutions was adjusted to 5.0 by the addition of 0.1 normal ammonia water or 0.1 normal hydrochloric acid, as necessary.

(6), (7) Rotating Gelation and Drying

The results of these experiments are shown in the following table:

| Silica Concentration (g/cc) | Condition of Dry Gel | | |
|---|---|---|---|
| material sol (0.06) | ⊗ | ○ | ⊗ |
| 0.10 | ⊗ | ◐ | ◐ |
| 0.15 | ◐ | ◐ | ⊗ |
| 0.20 | ○ | ○ | ○ |

In the table, ⊗, ◐ and ○ show that the resulting dry gel was fractured, that the resulting dry gel was cracked and that the resulting dry gel was perfwect, respectively.

As is apparent from the results, Solution B should be concentrated to a concentration of silica greater than about 0.15 g/cc.

(8) Sintering

All of the gels (even the fractured or cracked gels) were sintered as in Example 15 and silica glass of excellent quality was obtained.

EXAMPLE 19

(1), (2), (3), (4) Preparation of Solutions A and B, Concentration of Solution B, and Adjustment of pH before Mixture Eighteen (18) samples were prepared according to Steps (1) through (4) of Example 15.

(5) Mixing of Solution A and Solution B

Three (3) samples were tested at each of six (6) mixing ratios. Since the volume ratio of Solution A and Solution B was different at each mixing ratio, the final pH of the mixture was different. Accordingly, the final pH of the mixture solution was adjusted to 5.0 by adding 0.1 normal ammonia water or 0.1 normal hydrochloric acid, as necessary.

(6), (7), (8) Rotating Gelation, Drying, Sintering

The results of the above experiments are shown in the table below.

| M(A)/M(B) | Condition of Dry Gel | | | After Sintering | | | Quality |
|---|---|---|---|---|---|---|---|
| 0.1 | ◐ | ◐ | ○ | ◐ | ◐ | ⊗ | good |
| 0.2 | ◐ | ◐ | ○ | ◐ | ○ | ○ | good |
| 0.5 | ○ | ○ | ○ | ○ | ○ | ○ | good |
| 1 | ○ | ○ | ○ | ○ | ○ | ○ | good |
| 3 | ⊗ | ◐ | ○ | ⊗ | ⊗ | ○ | bubbling |
| 5 | ⊗ | ⊗ | ◐ | ⊗ | ⊗ | ⊗ | foaming |

The symbols are the same as used above.

The results indicate that in order to obtain large and high-quality tubular silica glass, the mixing ratio of Solution A and Solution B, in terms of the concentration of silica included in the mixture solution, should be between 0.2 and 3.

EXAMPLE 20

(1), (2), (3), (4), (5), (6) Preparation of Solutions A and B, Concentration of Solution B, Adjustment of pH before Mixture, Mixing of Solutions A and B, and Rotating Gelation Five tubular wet gels were formed as in Example 15.

(7) Drying

The 5 wet gels were not placed into a second container and were dried in the same rotating container used for gelling. Both ends of the container were sealed with lids. Each lid had openings amounting to 1% of the surface area of the lid. The wet gels were dried in a thermostatic chamber at a temperature of 60° C. Three of the 5 gels fractured during the drying step and two did not fracture or crack. The two which did not fracture or crack were considerably more curved than the gels obtained in Example 15.

EXAMPLE 21

(1), (2), (3), (4), (5), (6) Preparation of Solutions A and B, Concentration of Solution B, Adjustment of pH before Mixture, Mixing of Solutions A and B, and Rotating Gelation Five tubular wet gels were formed as in Example 15.

(7) Drying

The 5 wet gels were placed into drying containers having different opening ratios. The gels were dried in a thermostatic chamber at a temperature of 60° C. and the condition of the dry gels was observed.

The results of the experiments are shown in the following table.

| Opening Ratio of Container (%) | Condition of Dry Gel |
| --- | --- |
| 20 | cracked at room temperature |
| 10 | cracked in 2 days |
| 5 | cracked in 10 days |
| 0.5 | perfect (dried in 25 days) |

The table shows that when the opening ratio of the container is between 5 and 10%, it may be possible to prevent the gel from cracking by drying it at a low temperature. However, since a long time is required to completely dry the gel, efficiency is poor. In using a drying container having an opening ratio of 0.5%, the yield of complete dry gel was good, but a long time, namely, 25 days, was required to complete the drying. In view of the time required for drying and the obtainable yield, a suitable opening ratio is between about 1 and about 2%.

EXAMPLE 22

(1), (2), (3), (4), (5) Preparation of Solutions A and B, Concentration of Solution B, Adjustment of pH before Mixture, and Mixing of Solutions A and B Five sol solutions were prepared as described in Example 15 except that the pH of the final sol solution was adjusted to 5.10.

(6) Rotating

Each of the five gels was rotated at a different rotating rate. The effective rotating time, (i.e., the time it took for the sol to be completely gelled), was 30 minutes.

The results of these experiments are shown in the following table.

| Rotating Rate (rpm) | Centrifugal Gravity(G) | Condition of Wet Gel |
| --- | --- | --- |
| 100 | 0.3 | no hole in center |
| 500 | 7 | good |
| 1000 | 28 | good |
| 3000 | 250 | good |
| 6000 | 1000 | cracking (particle settling out) |

In the above table, G=980 cm/second$^2$.

(7), (8) Drying, Sintering

The five wet gels were dried and sintered as in Example 15.

The wet gel obtained by rotating at the rate of 3000 rpm looked good, but, after drying, peeling was observed on the inside of the gel. It is believed that this peeling was caused by silica particles that settled out as a result of centrifugal force exerted on the gel. It is believed further that the particle density of larger particles on the inner surface was low. This implies that rotation that is too violent is disadvantageous in obtaining a high-quality gel.

EXAMPLE 23

(1) Preparation of Solution A 300 g of 0.1 normal hydrochloric acid was added to 635 g of refined commercially available silicon methoxide and the solution was stirred violently in order to hydrolyze the silicon methoxide.

(2) Preparation of Solution B 6200 ml of anhydrous methanol, 575 ml of 29% ammonia water and 300 g of water were added to 635 g of refined commercially available silicon methoxide. After stirring for 2 hours, the solution was maintained overnight.

The particle size of the silica particles included in Solution B was measured using a granulometer and the mean particle diameter was 0.19μ.

(3), (4) Concentration of Solution B and Adjusting the pH before Mixing

Solution B was concentrated under reduced pressure until the silica concentration was 0.45 g/cc.

Then the pH of the concentrated Solution B was adjusted to 4.50.

(5) Mixing and Adjusting the pH of the Resulting Sol Solution

The pH of the sol solution resulting from the mixture of 918 ml of Solution A and 570 ml of Solution B was 4.35. The pH was adjusted to 4.80 by the addition of 0.2 normal ammonia water.

(6) Rotating Gelation 1256 ml of the sol solution was placed into a steel tube having a vinyl chloride lining. The dimension of the tube was 5 cm inner diameter and 100 cm length.

The ends of the tube were covered with silicon rubber stoppers and the tube was set in a rotating machine of the type shown in FIG. 1. Then the tube was rotated at a rotating rate of 1500 rpm until a control sample was completely gelled. The time required for the sol solution to be completely gelled was 70 minutes.

A tubular wet gel of 5.0 cm outer diameter, 30 cm inner diameter and 98 cm length was obtained.

(7) Drying

The wet gel was maintained in the rotating container for 3 days without rotating and was then placed into a box container (15 cm in width, 120 cm in length and 20 cm in height) of stainless steel with a lid having openings amounting to 1.5% of the surface area of the lid. The wet gel was heated from room temperature (25° C.) to 60° C. at a heating rate of 5° C. per hour and maintained at 60° C. for 15 days. A dry gel (3.5 cm outer diameter, 2.1 cm inner diameter and 69 cm length) which was stable enough so that no cracking occurred even at room temperature was obtained.

(8) Sintering

The resulting dry gel was placed into a tubular sintering oven constructed of quartz glass and heated from 30° C. to 200° C. at a heating rate of 30° C. per hour. The dry gel was maintained at 200° C. for 5 hours and heated from 200° C. to 300° C. at a heating rate of 30° C. per hour and maintained at 300° C. for 5 hours in order to remove absorbed water. The dry gel was heated further from 300° C. to 1050° C. at a rate of 30° C. per hour and maintained at 1050° C. for 30 minutes in order to remove carbon and ammonium chloride and to accelerate the dehydrating condensation reaction. The material was cooled to 700° C. and maintained for 30 minutes while a mixture of He and $Cl_2$ flowed through the oven at a rate of 2 l/min to 0.2 l/min. Thereafter, the material was heated to 800° C. at a heating rate of 60° C. per hour while He only flowed through the oven. The gel was maintained at 800° C. for 1 hour while a mixture of He and $Cl_2$ flowed through the oven at a rate of 2 l/min to 0.2 l/min. The dry gel was heated further to 800° C. at a rate of 60° C. per hour while He only flowed through the oven. The gel was maintained at 800° C. for 1 hour while a mixture of He and $Cl_2$ flowed through the oven at a rate of 2 l/min to 0.2 l/min. The dry gel was heated to 900° C. at a rate of 60° C. per hour while He only flowed through the oven. The gel was maintained at 900° C. for 1 hour while a mixture of He and $Cl_2$ flowed through the oven at a rate of 2 l/min to 0.2 l/min in order to remove OH groups. Next, the dry gel was heated to 1000° C. at a rate of 60° C. per hour while a mixture of He and $O_2$ flowed through the oven at a rate of 2 l/min to 0.4 l/min. The gel was maintained at 1000° C. for 1 hour in order to remove chloride. Then the resulting dry gel was heated to 1250° C. at a rate of 30° C. per hour while He only flowed through the oven and was maintained at 1250° C. for 30 minutes in order to close the pores in the gel.

The dry gel was placed into a box container and heated from 1250° C. to 1500° C. at a heating rate of 60° C. per hour. Transparent tubular silica glass (2.7 cm outer diameter, 1.6 cm inner diameter and 52 cm length) was obtained. The quality, amount of OH group, and other characteristics of the silica glass were the same as the characteristics of the silica glass prepared in Example 15.

It is expected that silica glass of equivalent high-quality can be provided regardless of the silicon alkoxide that is used as the starting material.

EXAMPLE 24

(1), (2), (3), (4), (5), (6), (7) Preparation of Solutions A and B, Concentration of Solution B, Adjustment of pH before Mixture, Mixing of Solutions A and B, Rotating Gelation and Drying A tubular dry gel was prepared as in Example 23.

(8) Sintering

The dry gel was placed into a tubular sintering oven constructed of quartz glass and heated from 30° C. to 200° C. at a heating rate of 30° C. per hour. After maintaining the gel at 200° C. for 5 hours, the gel was heated further to 300° C. at a heating rate of 30° C. per hour and was maintained at 300° C. for 5 hours in order to remove absorbed water. Then the gel was heated from 300° C. to 1050° C. at a rate of 30° C. per hour and maintained at 1050° C. for 30 minutes in order to remove carbon and ammonium chloride and to accelerate the dehydrating condensation reaction. The gel was cooled to 700° C. and maintained at 700° C. for 30 minutes while a mixture of He and $CF_4$ flowed through the oven at a rate of 2 l/min to 0.2 l/min. The dry gel was then heated to 800° C. at a heating rate of 60° C. per hour while He only flowed through the oven and the gel was maintained at 800° C. for 1 hour while a mixture of He and $CF_4$ flowed through the oven at a rate of 2 l/min to 0.2 l/min. The dry gel was heated further to 900° C. at a rate of 60° C. per hour while He only flowed through the oven and the gel was maintained at 900° C. for 1 hour while a mixture of He and $CF_4$ flowed through the oven at a rate of 2 l/min to 0.2 l/min in order to remove OH groups. Next, the dry gel was heated to 1000° C. at a rate of 60° C. per hour while a mixture of He and $O_2$ flowed through the oven at a rate of 2 l/min to 0.4 l/min and the gel was maintained at 1000° C. for 1 hour in order to remove fluoride. The dry gel was heated to 1250° C. at a rate of 30° C. per hour while He only flowed through the oven and the gel was maintained at 1250° C. for 30 minutes in order to close the pores in the gel.

The gel was placed into a box oven and heated from 1250° C. to 1400° C. at a heating rate of 60° C. per hour. The gel was maintained at 1400° C. for 2 hours. Transparent tubular silica glass was obtained.

The number of OH groups in the silica glass was less than 1 ppm. Moreover, even when the silica glass was heated to a molten state of about 2000° C. using a ring heater, no foaming was observed.

It is known that by including fluoride in the silica glass, the refractive index of the glass is lowered. Accordingly, when optical fiber using tubular silica glass including fluoride, as is obtained according to this Example, as a clad material and pure silica glass is used as a core material, manufacturing cost is considerably reduced as compared to optical fiber using a core including germanium, as is now generally used.

As described herein, it is possible to produce high-quality tubular silica glass articles which are dimensionally precise at low cost by the sol-gel method of the invention. The glass articles have excellent optical properties. Moreover, it is possible to attain very high yields of 90% and above during manufacture. By using the tubular silica glass having a low refractive index with fluoride as the clad material and pure silica glass as the core, an optical fiber is prepared at even lower cost. Thus, the invention can satisfy the increasing demands for tubular silica glass articles. Such silica glass prepared in accordance with the invention may be used as a supporting tube or jacket tube in manufacturing a master material of optical fiber.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of preparing tubular silica glass, comprising the steps of:
   preparing a solution of a silicon alkoxide hydrolyzed with an aqueous acid catalyst;
   adding ultra-fine particles of silica to the acid hydrolyzed silicon alkoxide solution to form a sol solution;
   adjusting the pH of the sol solution to between about 3 to 6;
   placing the sol solution into a cylindrical container;
   gelling the sol solution by rotating the container to obtain a tubular gel;
   drying the tubular gel to a dry gel; and
   sintering the dry gel to the tubular silica glass.

2. The method of claim 1 wherein the silicon alkoxide is silicon methoxide.

3. The method of claim 1 wherein the silicon alkoxide is silicon ethoxide.

4. The method of claim 1, wherein the ultra fine particle silica is added to the acid hydrolyzed silicon alkoxide solution in an amount from about 0.2 to 5 mols of silica per mol of silicon alkoxide.

5. The method of claim 1, wherein said ultra fine particle silica is selected from the group consisting of white carbon obtained by hydrolyzing $SiCl_4$ with an oxy-hydrogen flame burner, ultra fine particle silica obtained by a wet process using sodium silicon as a material and ultra fine particle silica obtained by hydrolyzing silicon alkoxide with ammonia water.

6. The method of claim 1, further including the step of:
   uniformly dispersing said ultra fine particle silica in said sol solution by ultrasonic vibration after the ultra fine particle silica is added to the acid hydrolyzed silicon alkoxide solution.

7. The method of claim 1, further including the step of:
   uniformly dispersing the ultra fine particle silica in the sol solution by removing masses from the sol solution using a centrifugal separator after the silica is added to the acid hydrolyzed silicon alkoxide solution.

8. The method of claim 1, further including the step of:
   adjusting the pH of the sol solution to between about 3 and 6 by addition of a base.

9. The method of claim 8, wherein said base is selected from the group consisting of ammonia water, ammonia gas, an aqueous solution of ammonia, triethylamine, an aqueous solution of triethylamine, pyridine, an aqueous solution of pyridine, aniline and an aqueous solution of aniline.

10. The method of claim 1, wherein the rotation of the rotating cylindrical container is controlled so that the maximum centrifugal gravity to which said sol solution is subjected is less than about 1,000 G (G=980 cm/second$^2$).

11. The method of claim 1, wherein in said cylindrical container has at least one lid covering the container and said lid is formed with openings covering less than about 50% of the surface area of the lid.

12. The method of claim 1, wherein the sol solution is gelled at a temperature between about 5° and 60° C. and dried at a temperature between about 20° C. and 120° C. and the temperature is raised from the gelling temperature to the drying temperature at a rate of less than about 120° C. per hour to yield the dry gel by a contraction drying method.

13. The method of claim 1, wherein the sintering of the dry gel includes the steps of (1) removing absorbed water, (2) removing carbon and (3) making the dry gel non-porous.

14. The method of claim 13, wherein absorbed water is removed by at least one step of heating the dry gel to a first selected temperature between about 20° and 400° C. at a rate of less than about 400° C. per hour and maintaining said dry gel at the first selected temperature for at least one hour.

15. The method of claim 13, wherein carbon is removed by at least one step of heating the dry gel to a second selected temperature between about 400° and 1100° C. at a heating rate of between about 30° and 400° C. per hour and maintaining the dry gel at said second selected temperature for at least 3 hours.

16. The method of claim 13, where the dry gel is made non-porous by at least one step of heating the dry gel to a third selected temperature between about 1000° and 1400° C. at a heating rate between about 30° and 400° C. per hour.

17. The method of claim 1 wherein the ultra fine particle silica is formed by hydrolyzing a second solution of silicon alkoxide with a base catalyst and the second solution is mixed with the acid hydrolyzed solution of silicon alkoxide to form the sol solution.

18. The method of claim 17 wherein the silicon alkoxide is silicon methoxide.

19. The method of claim 17, wherein the silicon alkoxide is silicon ethoxide.

20. The method of claim 17 wherein the silica particles in the second solution have a diameter of between about 0.01 and 1.0 μm.

21. The method of claim 17 further comprising the step of concentrating said second solution to adjust the concentration of the silica to between about 0.15 and 1.0 g/cc before mixing said second solution with said acid hydrolyzed solution of silicon alkoxide.

22. The method of claim 17, wherein the acid hydrolyzed silicon alkoxide solution and the second solution are mixed so that the amount of silica in the acid hydrolyzed silicon alkoxide solution M(A) with respect to the amount of silica in the second solution M(B) is between about 0.2 and 3, namely, M(A)/M(B)=0.2 to 3.

23. The method of claim 1, wherein the pH of the mixture of the acid hydrolyzed silicon alkoxide solution and the second solution is adjusted before gelation to between about 3 and 6 by adjusting the pH of either or both the acid hydrolyzed silicon alkoxide solution and the second solution before mixing, or by adjusting the pH of the sol solution after mixture of the two preparatory solutions.

24. The method of claim 17, wherein the sol is placed into a cylindrical container and gelled while rotating the container.

25. The method of claim 24, wherein the speed of rotation of the rotating cylindrical container is controlled so that the maximum centrifugal gravity acting upon the sol solution is less than about 1000 G (G=980 cm/second$^2$).

26. The method of claim 17, wherein the cylindrical container has lids covering both ends of the cylindrical container and the lids have openings amounting to less than about 10% of the surface area of the lid.

27. The method of claim 17, wherein said wet gel is removed from said cylindrical container and placed into a second container having openings amounting to less than about 10% of the surface area of said second container, said wet gel being dried in said second container.

28. The method of claim 17, wherein said sol is gelled at a temperatue of between about 5° and 60° C. and dried by raising the temperature to between about 40° and 160° C. at a heating rate of less than about 120° C. per hour to yield the dry gel by contracting.

29. The method of claim 17, wherein the sintering of the dry gel includes the steps of (1) removing absorbed water, (2) removing carbon, (3) accelerating the dehydrating conentration reaction, (4) closing the pores of the dry gel and (5) making the dry gel a clear glass.

30. The method of claim 17, wherein the sintering of the dry gel includes the steps of (1) removing absorbed water, (2) removing carbon, (3) accelerating the dehydrating concentration reaction, (4) removing OH groups, (5) removing chloride or fluoride, (6) closing the pores of the dry gel and (7) making the dry gel a clear glass.

31. The method of claim 29 wherein absorbed water is removed by at least one step of heating the dry gel to a first selected temperature between about 20° and 400° C. at a heating rate of less than about 400° C. per hour and maintaining said dry gel at said first selected temperature for at least about 1 hour.

32. The method of claim 30 wherein absorbed water is removed by at least one step of heating the dry gel to a first selected temperature between about 20° and 400° C. at a heating rate of less than about 400° C. per hour and maintaining said dry gel at said first selected temperature for at least about 1 hour.

33. The method of claim 29, wherein carbon is removed by at least one step of heating the dry gel to a second selected temperature between about 400° and 900° C. at a heating rate of from about 30° to 400° C. per hour.

34. The method of claim 30, wherein carbon is removed by at least one step of heating the dry gel to a second selected temperature between about 400° and 900° C. at a heating rate of from about 30° to 400° C. per hour.

35. The method of claim 29, wherein the dehydrating concentration reaction is accelerated by at least one step of heating the dry gel to a third selected temperature between about 900° and 1200° C. at a heating rate of from about 30° to 400° C. per hour and maintaining said dry gel at said third selected temperature for at least about 30 minutes.

36. The method of claim 30, wherein the dehydrating concentration reaction is accelerated by at least one step of heating the dry gel to a third selected temperature between about 900° and 1200° C. at a heating rate of from about 30° to 400° C. per hour and maintaining said dry gel at said third selected temperature for at least about 30 minutes.

37. The method of claim 30, wherein OH groups are removed by flowing a gas selected from the group consisting of He, $O_2$, $N_2$, Ar and mixtures thereof, and an OH group removing agent in an amount from about 1 to 40% with respect to gas flowing into the oven at a temperature in the range between about 700° and 1100° C.

38. The method of claim 37, wherein said OH group removing agent is selected from the group consisting of Cl, SOCl, $SF_6$, $CF_4$, $C_2F_6$, $C_3F_8$ and mixtures thereof.

39. The method of claim 30, wherein, after removing OH groups, chloride or fluoride is removed by flowing a gas selected from the group consisting of He, Ar, $N_2$, and mixtures thereof, in an amount from about 1 to 100% with respect to gas flowing into the oven at a temperature in the range between about 800° and 1200° C.

40. The method of claim 29, wherein the pores are closed in the dry gel by at least one step of (1) pulling a vacuum in the oven, or (2) flowing He gas into the oven, while heating the dry gel to a fourth selected temperature between about 900° and 1350° C. at a heating rate of from about 30° to 400° C. per hour and maintaining the dry gel at said fourth selected temperature for at least one hour.

41. The method of claim 30, wherein the pores are closed in the dry gel by at least one step of (1) pulling a vacuum in the oven, or (2) flowing He gas into the oven, while heating the dry gel to a fourth selected temperature between about 900° and 1350° C. at a heating rate of from about 30° to 400° C. per hour and maintaining the dry gel at said fourth selected temperature for at least one hour.

42. The method of claim 29, wherein the dry gel is made into a clear glass by heating to a fifth selected temperature between about 1200° to 1600° C.

43. The method of claim 30, wherein the dry gel is made into a clear glass by heating to a fifth selected temperature between about 1200° to 1600° C.

* * * * *